United States Patent
Scott et al.

(10) Patent No.: US 8,898,485 B2
(45) Date of Patent: Nov. 25, 2014

(54) POWER TRANSFER BETWEEN DEVICES

(75) Inventors: James W. Scott, Cambridge (GB); Stephen E. Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 12/503,605

(22) Filed: Jul. 15, 2009

(65) Prior Publication Data
US 2011/0016333 A1   Jan. 20, 2011

(51) Int. Cl.
*G06F 1/26* (2006.01)
*H02J 7/00* (2006.01)

(52) U.S. Cl.
CPC .............. *G06F 1/266* (2013.01); *H02J 7/0054* (2013.01)
USPC ....................................... 713/300

(58) Field of Classification Search
USPC ....................................... 713/300
See application file for complete search history.

(56) References Cited

U.S. PATENT DOCUMENTS

| | | | | |
|---|---|---|---|---|
| 5,914,585 A * | 6/1999 | Grabon | ......................... | 320/125 |
| 6,463,495 B1 * | 10/2002 | Angelo et al. | ................ | 713/300 |
| 6,992,580 B2 * | 1/2006 | Kotzin et al. | ............ | 340/539.11 |
| 7,015,596 B2 * | 3/2006 | Pail | ................ | 307/28 |
| 7,059,769 B1 * | 6/2006 | Potega | ........................... | 374/185 |
| 7,333,998 B2 | 2/2008 | Heckerman et al. | | |
| 7,383,451 B2 * | 6/2008 | Matsushima et al. | ......... | 713/300 |
| 7,415,623 B2 * | 8/2008 | Rapps et al. | .................. | 713/300 |
| 7,814,348 B2 * | 10/2010 | Krajcovic et al. | ............ | 713/300 |
| 8,255,716 B2 * | 8/2012 | Mandyam | ..................... | 713/320 |
| 2008/0075367 A1 | 3/2008 | Winn et al. | | |
| 2008/0137989 A1 | 6/2008 | Ng et al. | | |

FOREIGN PATENT DOCUMENTS

WO    WO2008133951 A2    11/2008

OTHER PUBLICATIONS

Ackley, et al., "A Learning Algorithm for Boltzmann Machines", retrieved on Jun. 19, 2009 at <<http://papers.cnl.salk.edu/PDFs/A%20Learning%20Algorithm%20for%20Boltzmann%20-Machines_%201985-3542.pdf>>, Cognitive Science 9, 1985, pp. 147-169.

"Boltzmann Machines and Deep Belief Networks", retrieved on Jun. 19, 2009 at <<http://plearn.berlios.de/machine_learning/node4.html>>, pp. 1-7.

Freund, et al., "Unsupervised Learning of Distributions on Binary Vectors using Two Layer Networks", retrieved on Jun. 19, 2009 at <<http://citeseerx.ist.psu.edu/viewdoc/download;jsessionid=222F08029D9EA7E2F4ECA6395A80-668F?doi=10.1.1.29.5728&rep=rep1&type=pdf>>, Baskin Center for Computer Engineering & Information Sciences, University of California, Santa Cruz, UCSC-CRL-94-25, Jun. 22, 1994, pp. 1-40.

(Continued)

*Primary Examiner* — Paul Yanchus, III
*Assistant Examiner* — Eric Chang
(74) *Attorney, Agent, or Firm* — Steve Wight; Judy Yee; Micky Minhas (57) ABSTRACT

Power transfer between devices such as laptop computers, mobile phones, personal digital assistants, media players and other devices is described. In an embodiment power transfer is achieved either from a power source at a device or to a power source at that device using a bidirectional power transfer connector. In some embodiments a power management module at the device uses context, models or other information to control factors such as the power transfer direction, duration and amount. In examples, user preferences are taken into account. In an example, the bi-directional power transfer connector is provided as a USB connection or a wireless power transfer connection.

20 Claims, 8 Drawing Sheets

(56) References Cited

OTHER PUBLICATIONS

Hinton, et al., "A Fast Learning Algorithm for Deep Belief Nets", retrieved on Jun. 19, 2009 at <<http://www.cs.toronto.edu/~hinton/absps/fastnc.pdf>>, 16 pages.

Kohli, et al., "Robust Higher Order Potentials for Enforcing Label Consistency", retrieved on Jun. 19, 2009 at <<http://research.microsoft.com/en-us/um/people/pkohli/papers/kIt_cvpr08.pdf>>, pp. 1-8.

Kumar, et al., "Discriminative Random Fields", retrieved on Jun. 19, 2009 at <<http://vision.ai.uiuc.edu/~sintod/KumarHerbert_IJCV06.pdf>>, International Journal of Computer Vision, Springer Science and Business Media, vol. 68, No. 2, 2006, pp. 179-201.

Larochelle, et al., "An Empirical Evaluation of Deep Architectures on Problems with Many Factors of Variation", retrieved on Jun. 19, 2009 at <<http://www.cs.toronto.edu/~amnih/cifar/talks/erhan_talk.pdf>>, University of Montreal, CIAR Summer School, Aug. 9, 2007, 24 pages.

Lee, et al., "Sparse Deep Belief Net Model for Visual Area V2", retrieved on Jun. 19, 2009 at <<http://books.nips.cc/papers/files/nips20/NIPS2007_0934.pdf>>, Computer Science Department, Stanford University, pp. 1-8.

Lu, et al., "A Scalable and Programmable Architecture for the Continuous Restricted Boltzmann Machine in VLSI", retrieved on Jun. 19, 2009 at <<http://ieeexplore.ieee.org//stamp/stamp.jsp?tp=&arnumber=04252884>>, The Department of Electrical Engineering, The National Tsing-Hua University, Taiwan, IEEE, 2007, pp. 1297-1300.

"On-The-Go and Embedded Host Supplement to the USB Revision 2.0 Specification", retrieved on Sep. 21, 2009 at <<http://www.usb.org/developers/onthego/USB_OTG_and_EH_2-0.pdf>>, May 2009, pp. i-ix and 1-70.

Osindero, et al., "Modeling image patches with a directed hierarchy of Markov random fields", retrieved on Jun. 19, 2009 at <<http://www.cs.toronto.edu/~hinton/absps/lateral.pdf>>, Department of Computer Science, University of Toronto, pp. 1-8.

Ranzato, et al., "Sparse Feature Learning for Deep Belief Networks", retrieved on Jun. 19, 2009 at <<http://yann.lecun.com/exdb/publis/pdf/ranzato-nips-07.pdf>>, pp. 1-8.

Ravi, et al., "Context-aware Battery Management for Mobile Phones", Proceedings of 2008 Sixth Annual IEEE International Conference on Pervasive Computing and Communications, 2008, pp. 1-10.

Ross, et al., "A Systematic Approach to Learning Object Segmentation from Motion", retrieved on Jun. 19, 2009 at <<http://web.mit.edu/mgross/www/publications/mgrIpk-cvw-paper-03.pdf>>, MIT Computer Science and Artificial Intelligence Laboratory, Massachusetts Institute of Technology, 8 pages.

Roth, et al., "Fields of Experts: A Framework for Learning Image Priors", retrieved on Jun. 19, 2009 at <<http://ieeexplore.ieee.org/stamp/stamp.jsp?tp=&isnumber=31473&arnumber=1467533>>, IEEE, 8 pages.

Shotton, et al., "Semantic Texton Forests for Image Categorization and Segmentation", retrieved on Jun. 19, 2009 at <<http://ieeexplore.ieee.org/stamp/stamp.jsp?tp=&arnumber=4587503&isnumber=4587335>>, IEEE, 2008, 8 pages.

Shotton, et al., "TextonBoost for Image Understanding: Multi-Class Object Recognition and Segmentation by Jointly Modeling Texture, Layout, and Context", retrieved on Jun. 19, 2009 at <<http://johnwinn.org/Publications/papers/TextonBoost_IJCV2009.pdf>>, Jul. 2, 2007, pp. 1-30.

Smolensky, "Information Processing in Dynamical Systems: Foundations of Harmony Theory", Parallel Distributed Processing, MIT Press, Cambridge, Chapter 6, vol. 1, 1986, pp. 194-281.

"The PASCAL Visual Object Classes Challenge 2008 (VOC2008) Results", retrieved on Jun. 19, 2009 at <<http://pascallin.ecs.soton.ac.uk/challenges/VOC/voc2008/results/index.shtml>>, Jun. 22, 2009, pp. 1-5.

Tieleman, "Training Restricted Boltzmann Machines using Approximations to the Likelihood Gradient", retrieved on Jun. 19, 2009 at <<http://portal.acm.org/ft_gateway.cfm?id=1390290&type=pdf&coll=GUIDE&dl=GUIDE&CFID=41904854&CFTOKEN=51911951>>, Proceedings of the 25th International Conference on Machine Learning, 2008, pp. 1064-1071.

Tu, et al., "Image Parsing: Unifying Segmentation, Detection, and Recognition", retrieved on Jun. 19, 2009 at <<http://lear.inrialpes.fr/people/triggs/events/iccv03/cdrom/iccv03/0018_chen.pdf>>, Proceedings of the Ninth IEEE International Conference on Computer Vision (ICCV 2003) 2-Volume Set, IEEE, 2003, 8 pages.

Tu, et al., "Image Segmentation by Data-Driven Markov Chain Monte Carlo", retrieved on Jun. 19, 2009 at <<http://www.stat.ucla.edu/~sczhu/papers/DDMCMC_reprint.pdf>>, IEEE Transactions on Pattern Analysis and Machine Intelligence, vol. 24, No. 5, IEEE, May 2002, pp. 657-673.

Zhu, et al., "A Stochastic Grammar of Images", retrieved on Jun. 19, 2009 at <<http://www.stat.ucla.edu/~sczhu/papers/Reprint_Grammar.pdf>>, Foundations and Trends in Computer Graphics and Vision, vol. 2, No. 4, 2006, pp. 259-362.

\* cited by examiner

POWER TRANSFER BETWEEN DEVICES

BACKGROUND

Facilities exist to enable power to be transferred from a laptop computer for example, to a mobile phone. For example, battery powered devices such as notebook computers exist which are able to charge smaller mobile devices such as music players, cell phones and PDAs over USB connections. Portable battery powered-devices are becoming increasingly widespread and individuals typically carry many different battery-powered devices with various size, power consumptions and battery capacities. This produces an increasing need to facilitate power transfer and reduce the burden on the end user of managing such power transfer. Power conservation is also a significant issue especially where battery-capacity is limited.

Typically, portable devices with rechargeable power sources often have limited power resources. Often they implement a power conservation process, for example, by automatically powering down when the device is not used for a specified period of time. This is another factor for users to consider when managing power transfer between a laptop for example, and a mobile phone. Existing systems are known which enable a laptop computer to power down for all components except a port which is known to be in use charging a mobile phone. The laptop computer then wakes-up periodically to query the attached mobile device to determine if it has been fully charged.

The embodiments described below are not limited to implementations which solve any or all of the disadvantages of known devices having power sources.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Power transfer between devices such as laptop computers, mobile phones, personal digital assistants, media players and other devices is described. In an embodiment power transfer is achieved either from a power source at a device or to a power source at that device using a bidirectional power transfer connector. In some embodiments a power management module at the device uses context, models or other information to control factors such as the power transfer direction, duration and amount. In examples, user preferences are taken into account. In an example, the bidirectional power transfer connector is provided as a USB connection or a wireless power transfer connection.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a power transfer device having a rechargeable battery, the system described is provided as an example and not a limitation. As those skilled in the art will appreciate, the present examples are suitable for application in a variety of different types of power transfer systems.

Figure 1:
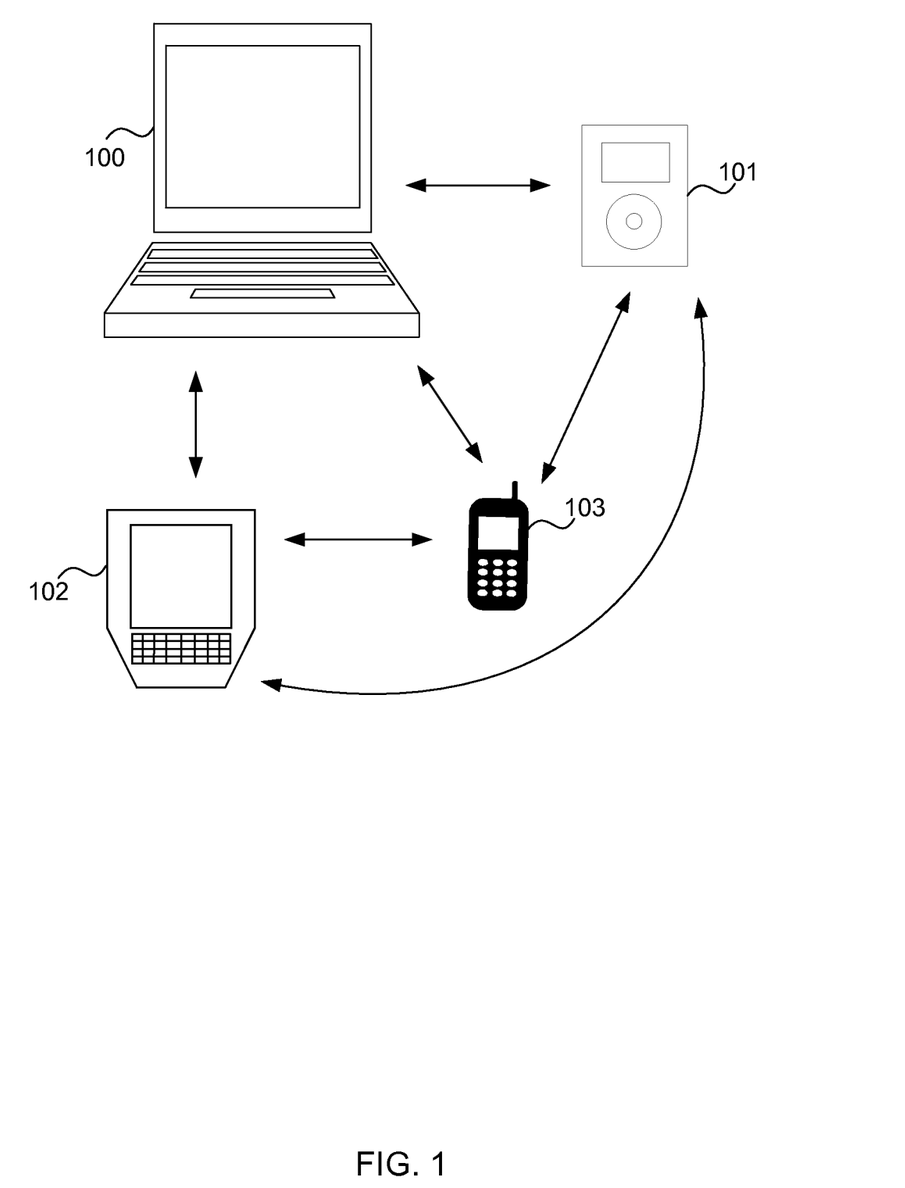
FIG. 1 is a schematic diagram of a plurality of devices having power sources and which are connected using any power transfer medium.

FIG. 1 is a schematic diagram of a plurality of devices (100, 101, 102, 103) having power sources that are connected (as indicated by the arrows) using any power transfer medium. A non-exhaustive list of example devices is: computers 100; media players 101; personal data assistants 102; mobile phones 103, battery power packs, mains chargers, vehicle satellite navigation units or any other device with a power source which can be arranged to connect using a power transfer medium to another device having a power source.

The power transfer medium may be any medium for transferring energy. For example the power transfer may be achieved using a power cable, a USB cable, a resonant induction connection, a microwave power transmission or other wireless power transfer link.

The power transfer medium is arranged to enable bi-directional power transfer; that is power may be transferred using the medium either into or out of a power source at the device. In this way devices of similar power capacity may share power such as two mobile phones, or a mobile phone and a satellite navigation unit. In other examples devices of different power capacity may share power. For example, a mobile phone may provide power to a laptop in the case that the laptop is low on power and it is required to obtain a crucial piece of information stored on the laptop. In another example, a media player may be charged up from a laptop or mobile phone. A plurality of devices may be chained together (either in series or in parallel) to facilitate transfer of power between devices. For example, media player 101 can be connected to mobile phone 103 which can further be connected to the computer 100. In that case, power can be transferred for example, from the media player to the mobile phone and from there to the computer.

Figure 2:
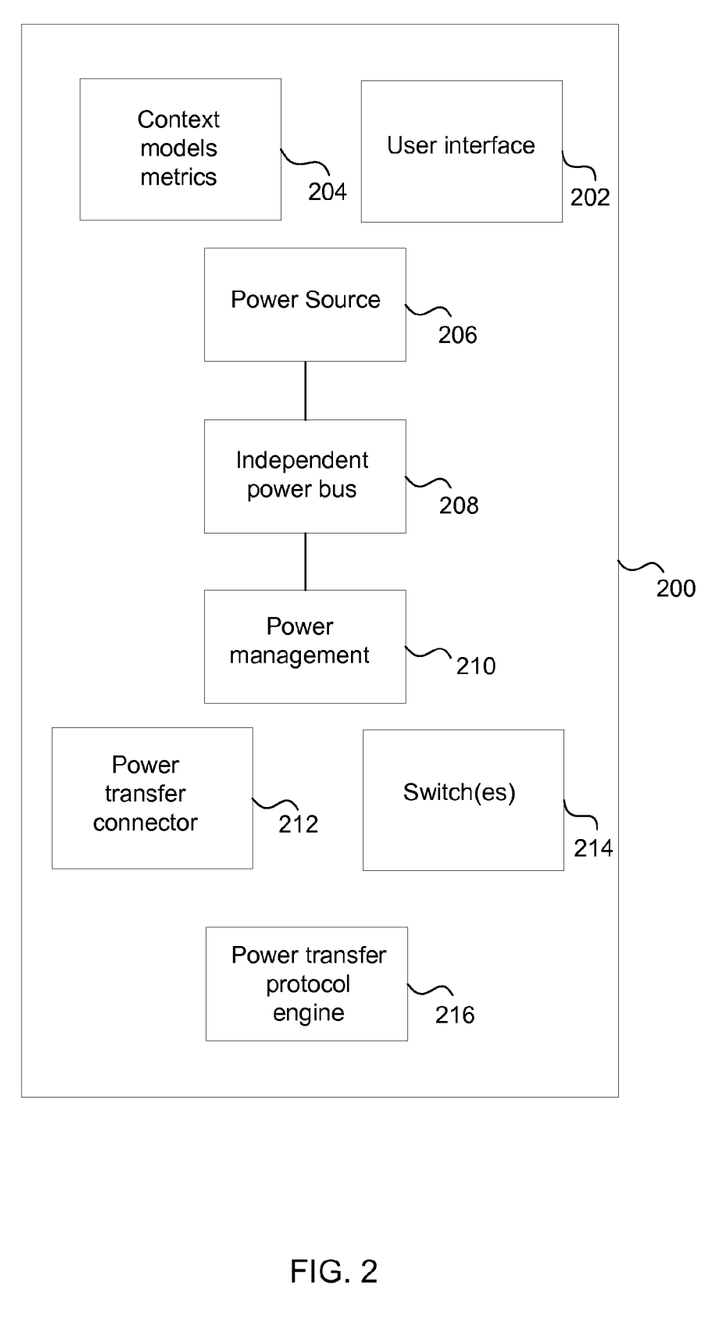
FIG. 2 is a schematic diagram of a device arranged to enable power transfer.

FIG. 2 is a schematic diagram of a device 200 arranged to enable power transfer. The device may comprise: a processor; a memory; a power source 206; and a bidirectional power transfer connector 212. The processor and the memory are described herein below, with reference to FIG. 6. The device may also optionally include: a power bus 208; a power management module 210; a user interface 202; information which will facilitate the device making an "intelligent" decision as to which other devices to share power with such as context, models and metrics 204; switches 214; and a power transfer protocol engine 216.

The power source 206 can be an internal (or external) rechargeable battery, such as a Lithium Ion battery, Lithium Polymer battery or Nickel-Metal Hydride battery. Rechargeable batteries may be large capacity such as, for example, found in a laptop computer or a lower capacity rechargeable battery which for example may be provided in a mobile phone. Rechargeable batteries may also be provided as external power packs. The power source 206 may also be a non-rechargeable battery such as an alkaline battery, or a mains power supply.

The bidirectional power connector 212 can be any type of connector which allows the transmission and reception of power between two devices. A non-exhaustive list of examples is: a mains power cable, a USB cable, an antenna, and an induction charger.

The power bus 208 comprises a connection between the battery and the power transfer connectors of the device. The power bus 208 is arranged to enable the power transfer connectors to provide power to another device. The power bus also enables the device to receive power from an external device. The power bus may be independent of the main functionality of the device. It may be able to operate even when the device is "off"; that is, when the main functionality of the device is powered down. Even if the device is powered down and not providing the user with any functionality it may still participate in power sharing in some embodiments. The power bus can refer to any type of appropriate bus such as wired power busses and wireless power busses.

The device 200 may also include a power management module 210 which is arranged to control the transfer of power to or from particular connectors 212 or devices. For example, the power management module 210 is arranged to control at least one of the: amount; direction; duration; and type of power transfer. The control of power transfer by the power management module 210 can also take into account any information the local device has on the scarcity or abundance of power at the local or remote device. The direction and quantity of the energy flow can be determined by the power management module 210 by the types, relative needs and current energy store of each device. The energy flow need not necessarily be from a high capacity, high powered device to a low capacity, low powered device. In one example, a media player could be used to power a mobile phone. In another example, the media player could be used to power a laptop computer for a short period of time in order to allow a critical piece of information to be accessed.

As mentioned above the power management module 210 may be arranged to control the amount of power transfer. For example, the power management module 210 may be arranged to vary the amount of power transferred according to the needed user of the receiving device. For example, in some examples, the transferred power is used to power a device without charging that device's batteries. A particular example of this involves transferring power from a music player to a drained laptop in order to lookup a piece of information stored on that laptop in an emergency. In other examples, the power management module allows the amount of power transferred to be enough to charge another device's battery for future independent use of that device. An example of this involves using a music player to charge a mobile phone so that the phone may later be disconnected and used independently of the music player. In other examples, the power management module controls the amount of power transfer such that only a subset of the functionality of another device is powered or for a low-power mode of that device. For example, a laptop may not receive enough power to turn on any peripherals but may receive enough transferred power to enable its core functionality with the lowest level of backlight.

The power management module may also be arranged to control the duration of the power transfer. For example, this may be controlled such that it is long enough for a user to perform a particular action. In another example, this may be controlled such that the duration is long enough to charge the power receiving device for a particular future use expectation or task. The use expectation and task information may be pre-configured, may be sent from the receiving device to the device providing power or may be specified by a user. In another example, the power transfer duration is controlled in relation to the relative levels of energy in the source and destination. In this way power may be transferred for example, until the remaining battery lifetime of both devices is substantially equal or meets a specified ratio.

The device may also include a user interface 202, in order to display information to the user regarding, for example: the availability of other devices from which power can be accessed; the current power status of the local device; and to allow the user to specify power transfer preferences.

The device can incorporate manual switches or software switches 214 which may be used independently or in conjunction with the user interface 202 to allow the user to specify their preferences as to which power transfer connectors 212 or other devices are eligible for energy sharing. In the case of a manual switch this can allow the user to directly enable or disable the power bus hardware 208.

The power transfer protocol engine 216 provides a low-bandwidth power transfer communication protocol which allows the local device to communicate with other devices enabled with the same protocol. The power transfer protocol engine 216 allows the devices to exchange information about their battery status and expected power needs and to enable negotiation with other devices about any one or more of: the amount, direction, duration, and type of power transfer between those devices. Devices whose main purpose is powering other devices such as mains chargers or battery packs can use the power transfer protocol engine 216 to broadcast their presence and status using for example, Bluetooth (trade mark) or wireless communication. The power transfer protocol can be sent along the same bus as the power, or along a separate data channel.

The power management module 210 can use a number of different pieces of information to negotiate power transfer. These pieces of information can include; context, models and metrics 204 and will be described in greater detail with reference to FIG. 3 below.

Figure 3:
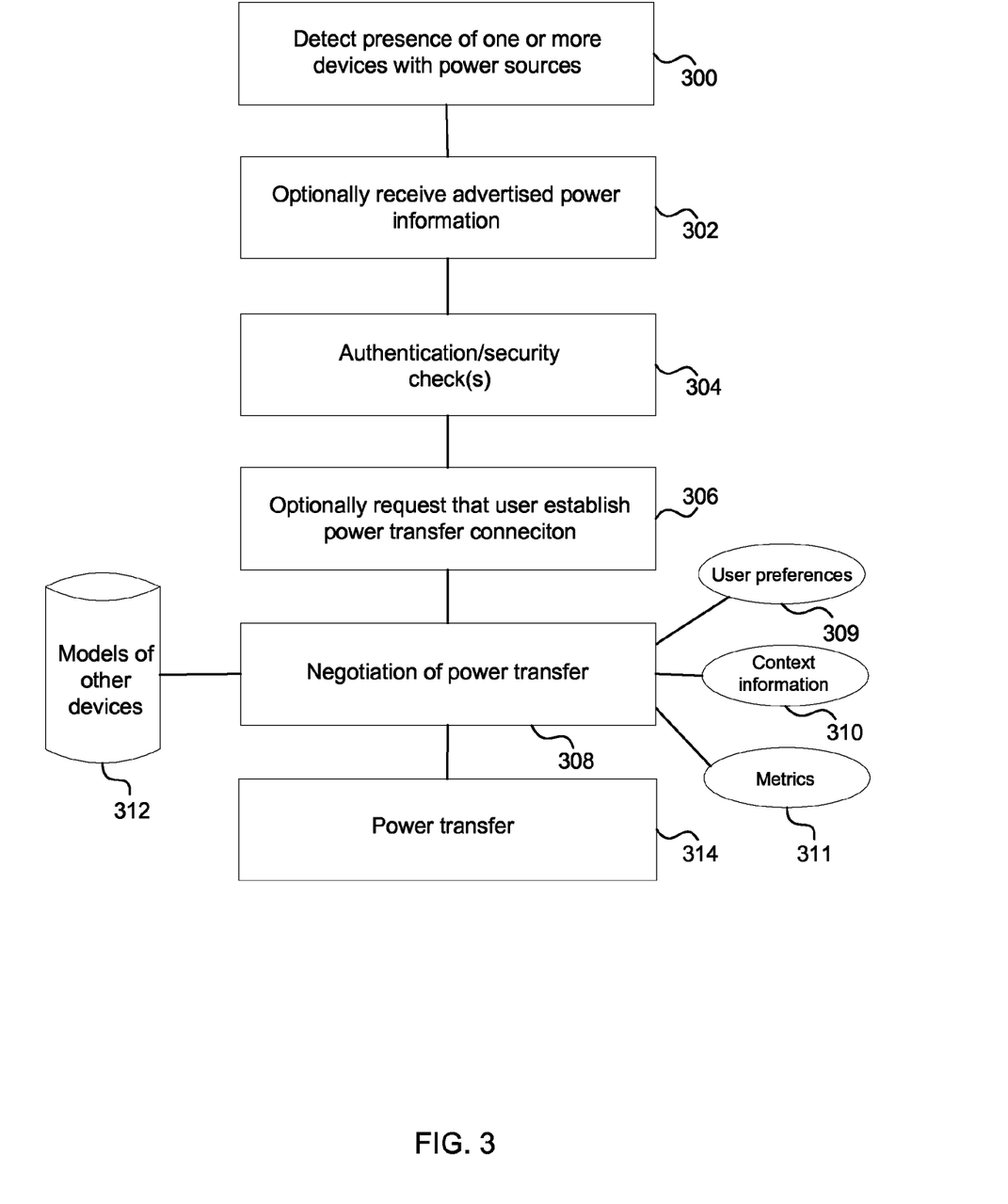
FIG. 3 is a flow diagram of a method of operating a device such that power is transferred between that device and another device.

FIG. 3 is a flow diagram of a method of operating a device such that power is transferred between that device and another device. The method comprises, detecting 300 the presence of one or more other devices which have power sources, optionally receiving 302 advertised power information from those other device(s); and optionally requesting that a user establishes 306 a power transfer connection. The method further comprises a negotiation 308 between the devices regarding the nature of the power transfer and a transfer 314 of power to or from the local device.

The local device detects 300 the presence of one or more further devices with power sources. This may be for example by the devices being physically connected to one another using a wired connection, or through a wireless connection such as a wireless network or Bluetooth connection.

The device can optionally receive 302 advertised power information from the (one or more) further devices using the power transfer protocol 216. One or both of the devices may be powered down. One or more of the devices may be in different power modes such as 'in flight', 'suspend' or 'hibernate'.

The power transfer protocol 216 can also optionally carry out authentication and/or security checks 304. For example in the case of a peripheral device connected to a computing device the power transfer protocol may check whether or not the peripheral device is registered to the computing device and therefore allowed to share power. In the case of two peripheral devices the authentication may check that both devices are registered to the same person.

The local device can then optionally request 304 that the user establishes the power transfer connection 306. This request may be displayed on the user interface 202.

The device may further negotiate 308 the power transfer using a number of further pieces of information. The negotiation of power transfer specifies information about the power transfer. For example, the amount of power transferred, the direction of the transfer and whether the device is to be charged from the further device or whether device is to be used to provide enough power to operate the device but not to charge the battery.

The device can take into account user preferences 309 specified using the user interface 202. Other methods of deciding whether or not to provide power can be used. The device can take into account context information 310, such as the nature, relative needs and current energy store of all available devices when selecting which devices to either receive power from or provide power to.

Decisions can be made based on metrics 311 such as the available battery power of the device such that, for example, a static threshold is used whereby the device only provides power if it has more than a certain percentage of it's battery power left. Other more complex metrics may be used. For example, the device may be arranged to only provide power if the expected time until the next recharge opportunity for the device is such that that it has surplus energy to reach that time.

Models of other devices can also be used when negotiating power transfer 308. These models may include such information as: prediction of lifetime for a specified battery model; a prediction of the length of operation time; predicting of the location of the user using mobility traces and their proximity to a charging location; and the threshold level required to charge the device and not just power it. The negotiation of power transfer between the devices may rely on a single device such as a laptop deciding to share power or may require a joint or collective decision from all the devices.

The power transfer 314 can take place in either direction between devices. The power transfer can be carried out between devices when one or more of the devices are switched off or powered-down. The power bus 208 can be for example, used to keep lower powered devices connected to a high powered device on despite the higher power device being suspended. For example selective suspend can be used to only power those power transfer connectors 212 which are in use. The computer 100 can be set to hibernate and wake up periodically to check whether the connected devices are still charging. In another example the computer 100 may be set to suspend but such that any device can draw a preset maximum of current from the power transfer connectors 212.

In a further example the devices may be connected using a USB on-the-go configuration. In a standard USB architecture a USB host acts as the protocol master and a USB slave acts as the slave. In this case only the host can initiate power transfer. In the USB on-the-go configuration any device can perform both master and slave roles. In this configuration a device can act as the master device and initiate transfer from the slave device even when the slave device is in a powered down mode.

Powered down modes can include modes such as: 'in-flight', 'offline', hibernate; or any mode where the full functionality of the device is disabled or at least partially disabled. The term "powered-down" is used to refer to any low-power state of an electrical device such as suspend mode, hibernate mode, off mode, in-flight mode, offline mode.

Figure 4:
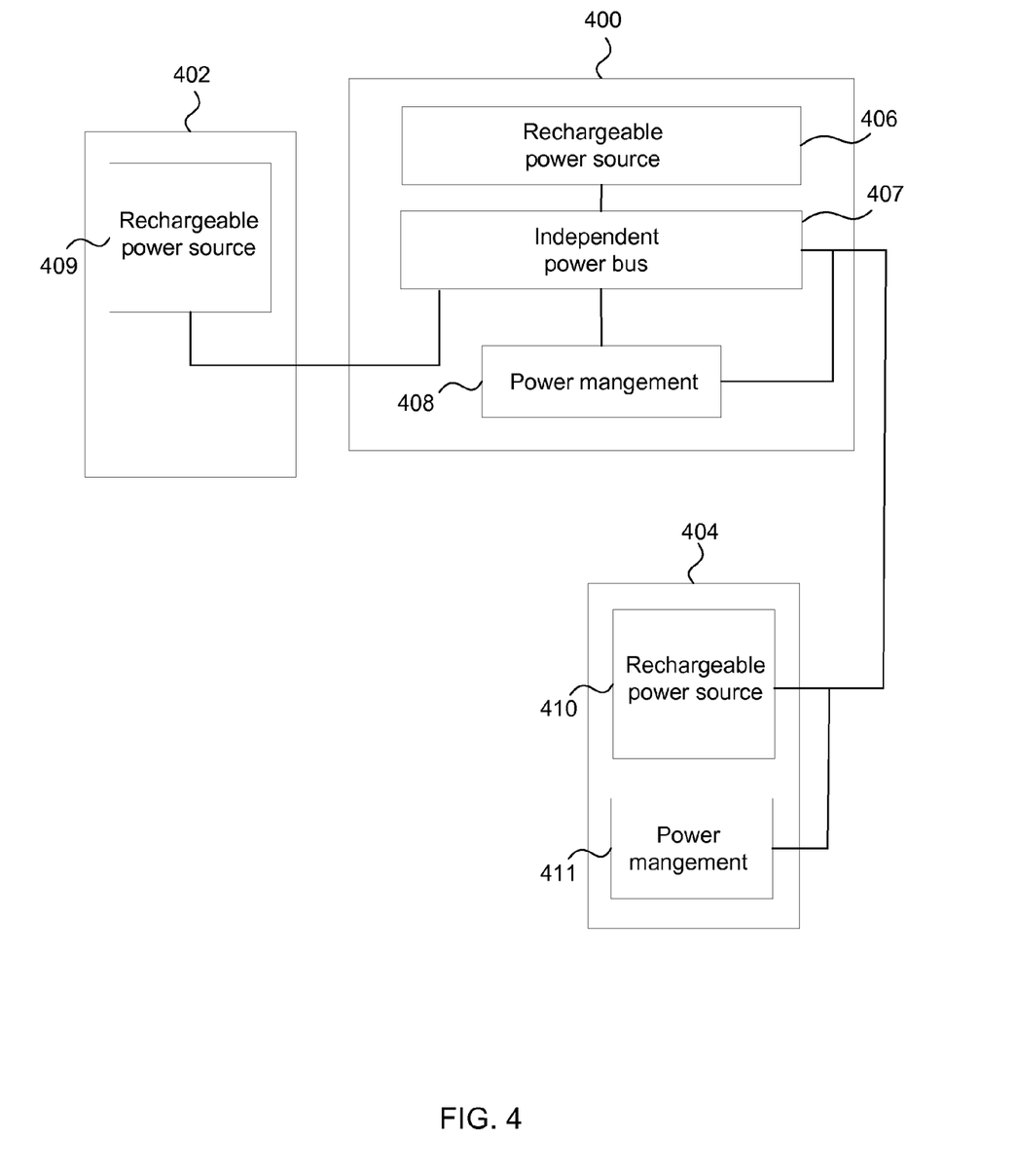
FIG. 4 is a schematic diagram of a plurality of devices having power sources and which are connected to one another using USB connections for power transfer.

FIG. 4 is a schematic diagram of a plurality of devices having power sources and which are connected to one another using USB connections for power transfer. A device 400 has a rechargeable power source 406, an independent power bus 407 and a power management module 408. A second device 404 has a rechargeable power source and a power management module 411. A third device 402 has a rechargeable power source 409.

The power bus 407 comprises a connection between the rechargeable power source 406 and the power transfer connectors of the device 400. The bus may be independent of the main functionality of the device. It may be able to operate even when the device is "off". Even if the device is powered down and not providing the user with any functionality it can still participate in power sharing. The bus can refer to any type of appropriate bus such as wired power busses and wireless power busses.

The power management module 408 is arranged to control the transfer of power to or from particular power transfer connectors or other devices. The power management module uses a feedback parameter to assess the power requirements of the local and remote devices. The feedback parameter comprises information about the status of the local device and the status of the remote devices. The power management module 408 modifies the operation of the power bus 407 based on the received feedback.

The feedback parameter comprises information about one or more of the: amount; direction; duration; and type of power transfer. The feedback parameter can also include information the local device has on the scarcity or abundance of power from the local or remote device. The direction and quantity of the energy flow can take into account the types, relative needs and current energy store of each device.

The feedback parameter can be used in conjunction with user preferences 309, context information 310, metrics 311 and models of other devices 312 in order control the transfer of power between devices.

The second device 404 also has a power management module 411. This second device 404 is referred to as a 'compliant' device in that it is able to provide information regarding its current power status to the first device using a power transfer protocol known to both devices. This enables the devices to negotiate power transfer based on the needs/status or other information about each device. For example if the rechargeable power source 406 of the first device 400 was fully charged and the rechargeable power source 410 of the second device 404 was only 25% charged the devices could negotiate to transfer power from the first device to the second device.

The third device 402 is known as a non-compliant device as it comprises a rechargeable power source 409 but does not have a power management module or knowledge of the appropriate power transfer protocol. The device 402 is able to share power with the other devices 400, 404. The other devices may be able to control power transfer with the third device 402 based on information such as: models of the known battery lifetime; user preferences and context.

If the first device has a high capacity rechargeable power source and the further devices have low capacity power sources it may be able to charge the further devices with relatively little loss of its own charge. In an alternative scenario the power management modules may determine in certain cases that it is best to share available power between two devices with a similar capacity.

In the embodiment described there are three devices involved in power sharing but the power sharing may take place between a plurality of devices.

Figure 5:
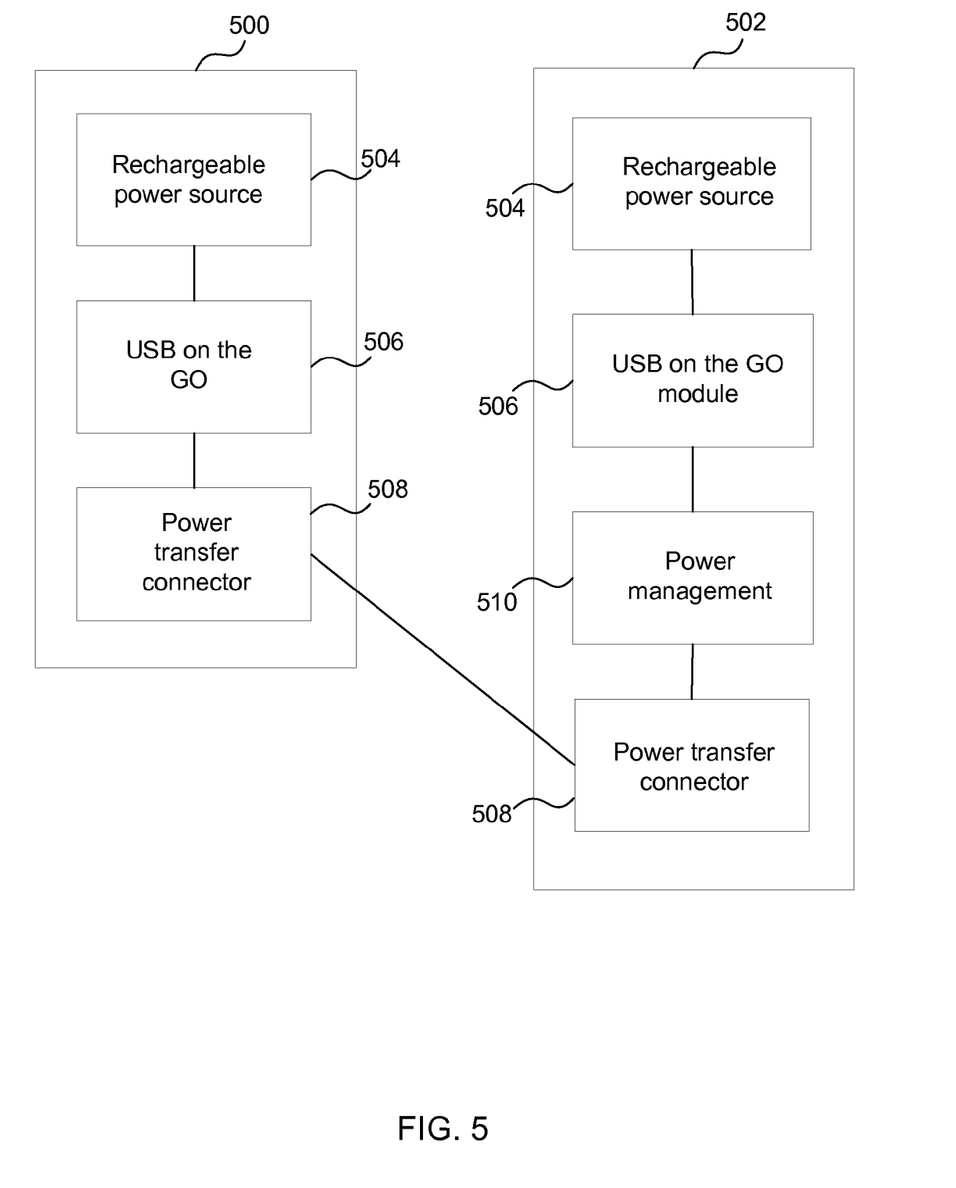
FIG. 5 is a schematic diagram of two devices which are connected to one another for bidirectional power transfer using USB OTG.

FIG. 5 is a flow diagram of another embodiment in which USB on the go (USB OTG) is used. USB on the go is described in detail in the "On-the-go and embedded host supplement to the USB revision 2.0 specification" Revision 2.0 8 May 2009 which is incorporated herein by reference in its entirety. USB OTG enables host capability to be added to products that have previously been peripherals only to enable point-to-point connections. Also, it provides the ability for a device to be either a host or a peripheral and to dynamically switch between these two roles.

As shown in FIG. 5 two devices 500, 502 are provided and arranged to share power. These devices may be a mobile phone 502 and a satellite navigation unit 500 for example although other devices may be used as mentioned above. Each device comprises a rechargeable power source 504, USB OTG functionality 506 as well as a bidirectional power transfer connector 508 implemented using USB OTG. At least one of the devices (in this example the mobile phone 502) comprises a power management module 510 arranged to control the bidirectional power transfer between the devices. In this embodiment, data connections which rely on a particular one of the devices 500, 502 being a "host" may not be preserved.

Figure 6:
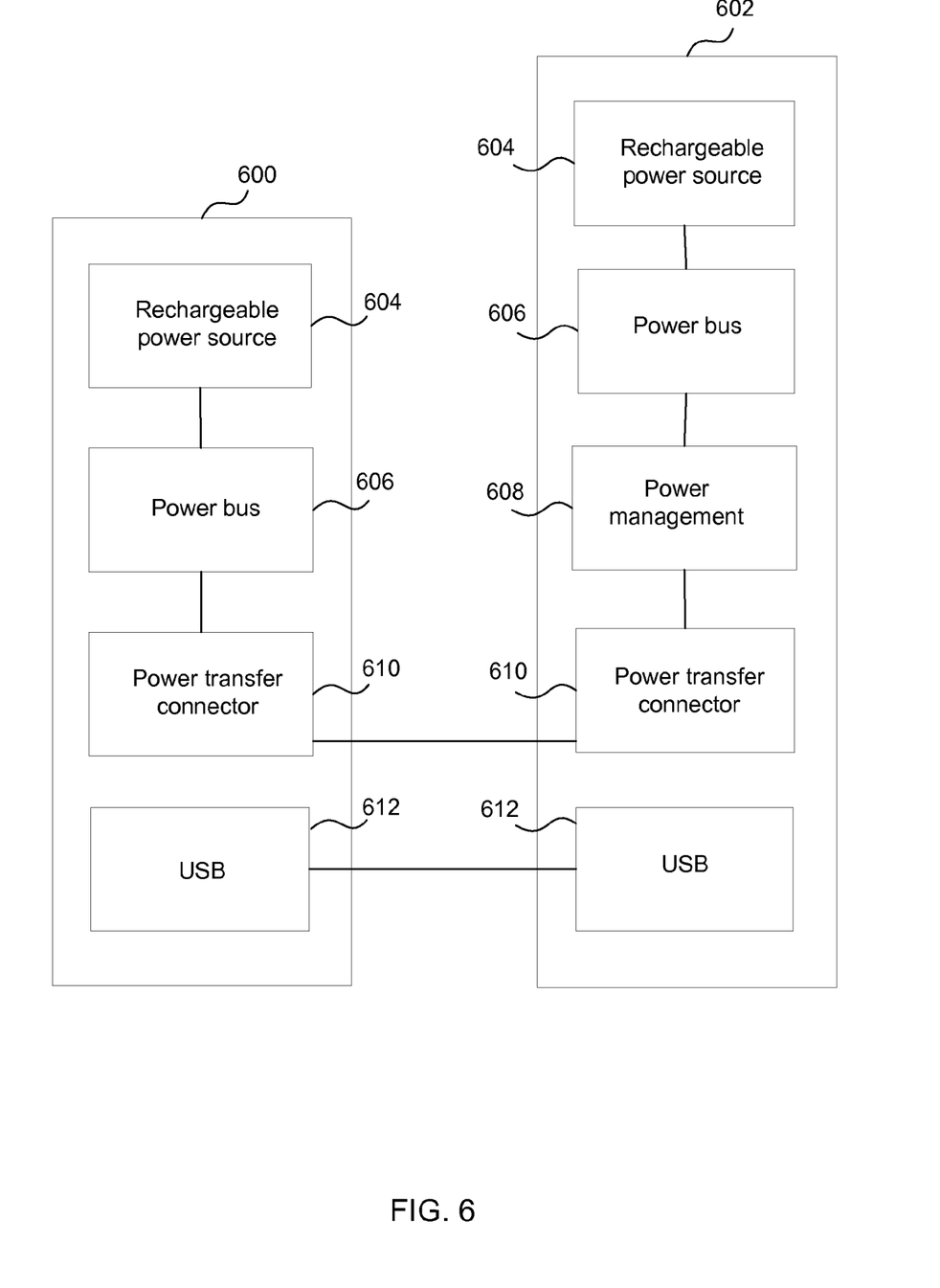
FIG. 6 is a schematic diagram of two devices which are connected to one another for bidirectional power transfer.

In another embodiment described with reference to FIG. 6 both normal USB functionality and bidirectional power transfer is provided. In this case the two devices 600, 602 both comprise a rechargeable power source 604, a power bus 606, a power transfer connector 610 and a USB connector 612. At least one of the devices 602 comprises a power management module 608. Bi-directional power transfer is provided independently of the USB connection between the two USB connectors 612. In this way any restrictions inherent in the USB standard on how much power can be provided are not applicable to the bidirectional power transfer link between the power transfer connectors 610.

Figure 7:
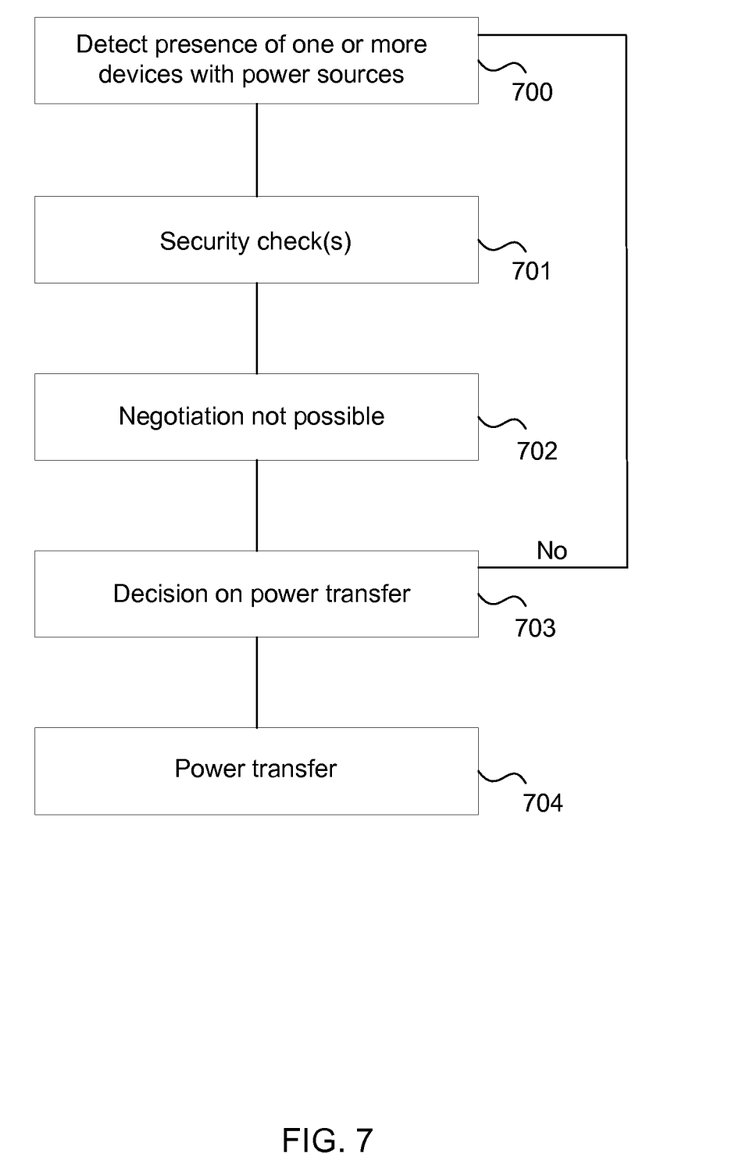
FIG. 7 is a flow diagram of another method of operating a device such that power is transferred between that device and another device.

FIG. 7 is a flow diagram of another method of operating a device such that power is transferred between a compliant device and a non-compliant device or between two non-compliant devices. The device detects the presence 700 of one or more devices with power sources. The detection may take place when the devices are connected using for example a USB cable or are connected over a wired network. Alternatively the devices may broadcast their presence and availability of power sources over a wireless network or using a protocol such as Bluetooth (trade mark). Optional security checks are carried out 701 to authenticate the devices and/or check that power can be securely transferred. The device (in the case that it is a compliant device) determines 702 that negotiation is not possible with the detected device(s). For example, if no responses are received to attempted connection requests. The device then proceeds to make a decision 703 about whether to enable power transfer between the devices using information such as: models of the known battery lifetime; user preferences and context. The power transfer 703 then takes place.

In another embodiment a first device such as that of FIG. 2 comprises a power management module which is configured to enable charging of a rechargeable power source 206 at the device to a target which is less than 100% of its capacity and to enable output of power from the power source 206 to a maximum of all the power available. Setting targets in this way facilitates power transfer between devices.

Figure 8:
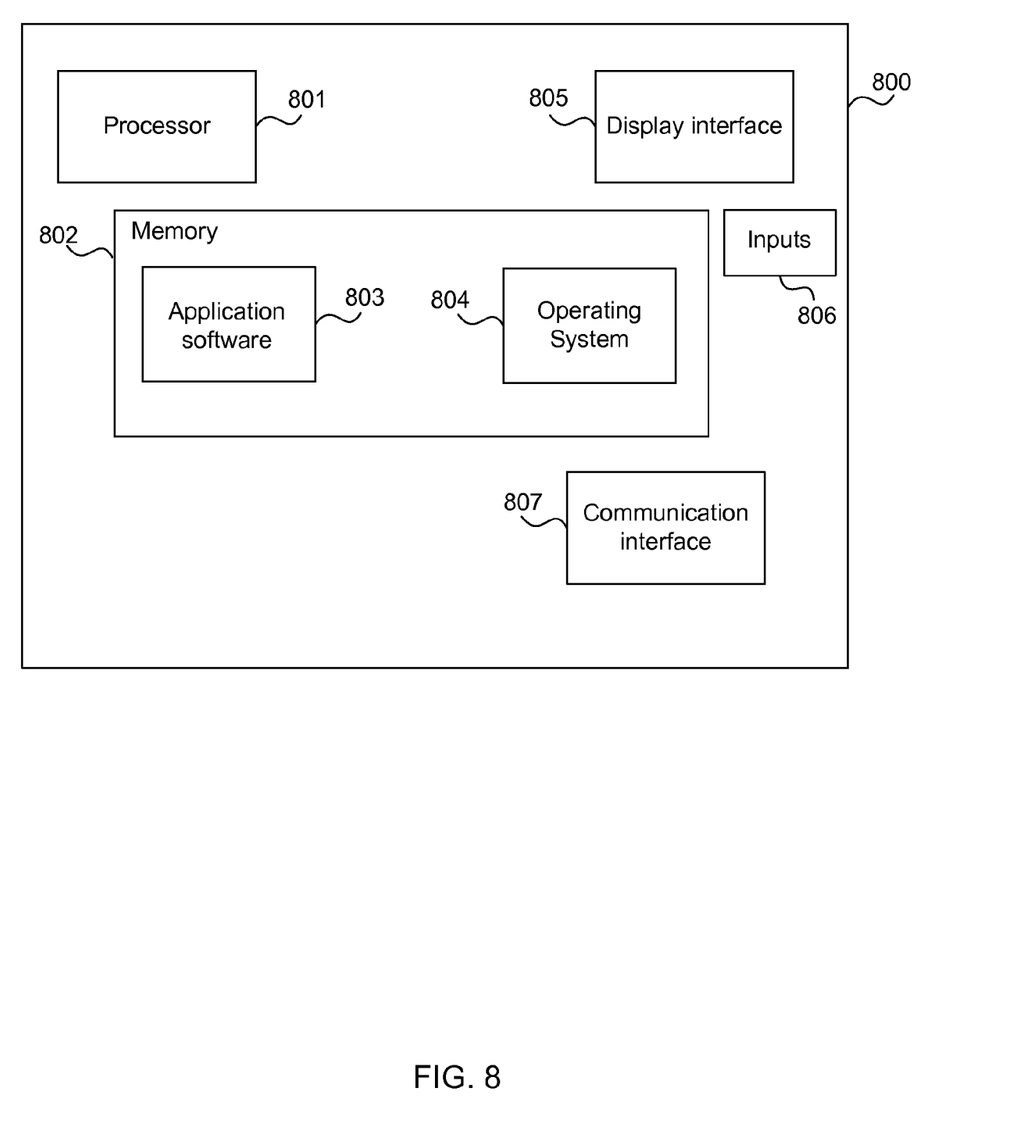
FIG. 8 illustrates an exemplary computing-based device in which embodiments of a power transfer device may be implemented.

FIG. 8 illustrates various components of an exemplary computing-based device 800 which may be implemented as any form of a computing and/or electronic device, and in which embodiments of a device arranged for power sharing may be implemented.

The computing-based device 800 comprises one or more inputs 806 which are of any suitable type for receiving media content, Internet Protocol (IP) input, power transfer communication protocol messages; user input; or other input. The inputs 806 may also comprises power transfer connectors as described above with reference to FIG. 2. The device also comprises communication interface 807 to enable the device to communicate with one or more other entities over a communications network.

Computing-based device 800 also comprises one or more processors 801 which may be microprocessors, controllers or any other suitable type of processors for processing computing executable instructions to control the operation of the device in order to facilitate power transfer between the device and other devices. Platform software comprising an operating system 804 or any other suitable platform software may be provided at the computing-based device to enable application software 803 to be executed on the device.

The computer executable instructions may be provided using any computer-readable media, such as memory 802. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The output may also comprise the power transfer connector(s) as described above with reference to FIG. 2. A display interface 805 may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A device comprising:
   a processor;
   a memory coupled to the processor;
   a power source;
   a user interface arranged to:
      display an availability of other devices having respective power sources from which power can be accessed;
      display a current power status of the device; and
      display user selectable power transfer preferences that enable a user to define power transfer preferences between the device and the other devices;
   at least one bi-directional power transfer connector arranged to enable the device to be connected to another device having a power source;
   a power bus linking the power source and the power transfer connector and arranged to enable bi-directional power transfer relative to the power source; and
   a power management module connected to the power bus and arranged to control the bi-directional power transfer, the power management module being configured to determine whether to provide a first level of power or a second level of power to a second device, the first level of power being sufficient to power operation of the second device, the second level of power being sufficient to power operation of the second device and charging of a battery of the second device, the determination being based at least in part on whether the battery of the second device is to be charged.

2. A device as claimed in claim 1 wherein the power management module is arranged to control at least one of the: amount, direction, duration, and type of the power transfer.

3. A device as claimed in claim 1 which further comprises a power transfer protocol engine arranged to enable communication with other devices enabled with the same protocol.

4. A device as claimed in claim 3 wherein the power transfer protocol engine is arranged to enable negotiation with other devices about any of: amount, direction, duration, type of power transfer between those devices.

5. A device as claimed in claim 3 wherein the power transfer protocol engine is arranged to implement security measures.

6. A device as claimed in claim 3 wherein the processor is arranged to automatically detect the presence of at least one other device having a power source and wherein the power transfer protocol engine is arranged to negotiate potential power transfer with that detected device.

7. A device as claimed in claim 6 wherein the processor is arranged to provide a user interface and wherein the processor is arranged to generate a request at the user interface to request that a user establish a power transfer connection with the detected device on the basis of the negotiation.

8. A device as claimed in claim 1 wherein the power management module is arranged to use at least one of: power transfer context information; the user defined preferences; thresholds; metrics; rules; type of connected device; battery state.

9. A device as claimed in claim 1 wherein the power management module is arranged to form a model of the other device and to use that model to control the bi-directional power transfer.

10. A device as claimed in claim 1 wherein the power bus and at least one power transfer connector are arranged to be operable when the device is powered down.

11. A device as claimed in claim 1 wherein the power bus, power management module and at least one power transfer connector are arranged to be operable when the device is powered down.

12. A device as claimed in claim 1 wherein the power source is rechargeable and wherein the power management module is arranged to allow charging of the power source up to a target which is less than 100% and to allow transfer of power from the power source up to a maximum of all the power.

13. A device as claimed in claim 1 which further comprises at least one switch arranged to enable or disable the power transfer connector.

14. A device as claimed in claim 1 wherein the power management module uses metrics including determining whether the device is to provide power to at least one of the other devices based at least in part on a determination by the device of whether the device has surplus power to reach an expected next recharge opportunity for the device based on an expected power usage of the device until the expected next recharge opportunity.

15. A portable device comprising:
a processor;
a memory coupled to the processor;
a power source;
a user interface arranged to enable a user to provide user power transfer preferences between the first device and a second device having a power source from which power can be accessed;
at least one bi-directional power transfer connector arranged to enable the first device to be connected to the second device having the power source;
a power bus linking the power source and the power transfer connector and arranged to enable bi-directional power transfer relative to the power source both when the first device is powered on and when the first device is powered down; and
a power management module connected to the power bus and arranged to control the bi-directional power transfer, the power management module being configured to determine whether to provide a first level of power or a second level of power to the first device, the first level of power being sufficient to power operation of the first device, the second level of power being sufficient to power operation of the first device and charging of a battery of the first device, the determination being based at least in part on whether the battery of the first device is to be charged.

16. A portable device as claimed in claim 15 wherein the power management module is arranged to take the user power transfer preferences into account.

17. A portable device as claimed in claim 15 which further comprises at least one switch arranged to enable or disable the power transfer connector.

18. A method at a device having a power source comprising:
using a processor to detect the presence of at least one other device having a power source;
using the processor to assess whether power transfer negotiation with the detected device is possible;
using the processor to display, on a user interface of the device, power transfer preferences, the displayed power transfer preferences being selectable by a user and defining power transfer preferences between the device and the detected device;
using a power management module to make a decision about bi-directional power transfer between the devices on the basis of the user selected power transfer preferences, the decision including a determination of whether to provide a first level of power or a second level of power to a second device, the first level of power being sufficient to power operation of the second device, the second level of power being sufficient to power operation of the second device and charging of a battery of the second device, the determination being based at least in part on whether the battery of the second device is to be charged;
establishing a connection between the detected device and a bi-directional power transfer connector at the device; and
using a power transfer bus to carry out power transfer between the devices.

19. A method as claimed in claim 18 wherein the step of establishing a connection comprises using the processor to generate a request at the user interface of the device, the request being for the user to form a physical connection between the devices.

20. A method as claimed in claim 18 which further comprises using a power transfer protocol engine to carry out power transfer negotiation with the detected device.

* * * * *